United States Patent
Johanson et al.

(10) Patent No.: US 6,215,860 B1
(45) Date of Patent: Apr. 10, 2001

(54) ELASTIC BUFFER FOR DATA STORAGE WITH SPEECH DATA

(75) Inventors: James A. Johanson, Emmaus; Glenn A. Ehrich, Wescosville; Richard M. Ubowski, Harleysville, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/931,513

(22) Filed: Sep. 16, 1997

(51) Int. Cl.⁷ ...................................................... H04M 1/65
(52) U.S. Cl. ...................................... 379/88.28; 379/88.13
(58) Field of Search ............................... 379/88.13, 88.28, 379/142, 90.01, 93.08, 88.14, 88.22, 88.27

(56) References Cited

U.S. PATENT DOCUMENTS

| | | | |
|---|---|---|---|
| 5,153,579 | * | 10/1992 | Fisch et al. .......................... 379/88.28 |
| 5,414,758 | * | 5/1995 | Kuok ................................... 379/88.28 |
| 5,483,580 | * | 1/1996 | Brandman et al. ..................... 379/88 |
| 5,588,046 | * | 12/1996 | Knuth et al. ........................ 379/88.28 |
| 5,600,821 | * | 2/1997 | Falik et al. ......................... 379/88.28 |

* cited by examiner

Primary Examiner—Scott L. Weaver
(74) Attorney, Agent, or Firm—William H. Bollman

(57) ABSTRACT

A digital answering machine, electronic voice mail system, or any other voice messaging system integrating both non-speech data such as caller ID information or graphical or pictorial images together with associated speech data in common memory such that only one message table is necessary. The integrated common memory is divided into sectors, and each sector is divided into pages which each contain both speech and non-speech data. A single message table is associated with each corresponding set of speech and non-speech data, and includes an offset value indicating the beginning address of the speech data stored just above its associated non-speech data in the first linked page. The offset value is variable to provide an elastic non-speech data buffer to accommodate variable length non-speech data such as would be required by the various caller ID standards throughout the world.

35 Claims, 5 Drawing Sheets

MESSAGE TABLE SECTOR

200

| | |
|---|---|
| TIME/DATE | —802 |
| TAG | —804 |
| CODER | —806 |
| NEW/OLD | —808 |
| DELETED/NON-DELETED | —810 |
| # BYTES IN LAST SECTOR | —812 |
| LINK LIST | —814 |
| ETC. | —816 |
| OFFSET | —202 |

FIG. 2
MESSAGE TABLE SECTOR

200

| | |
|---|---|
| TIME/DATE | 802 |
| TAG | 804 |
| CODER | 806 |
| NEW/OLD | 808 |
| DELETED/NON-DELETED | 810 |
| # BYTES IN LAST SECTOR | 812 |
| LINK LIST | 814 |
| ETC. | 816 |
| OFFSET | 202 |

FIG. 3
DATA SECTOR

300

| | | |
|---|---|---|
| 352 — NON-SPEECH DATA | 0 | (0) |
| 354 — NON-SPEECH DATA | 1 | |
| 356 — NON-SPEECH DATA | 2 | |
| ⋮ | ⋮ | |
| 358 — NON-SPEECH DATA | N−1 | |
| 902 — ENCODED SPEECH DATA | N | |
| 904 — ENCODED SPEECH DATA | N+1 | |
| ⋮ | ⋮ | |
| 908 — ENCODED SPEECH DATA | 127 | (7F) |

MEMORY SECTORS

PRIOR ART
500

MEMORY PAGES PER SECTOR

PRIOR ART
600

FIG. 7
MESSAGE TABLE SECTOR

PRIOR ART
800

| |　|
|---|---|
| TIME/DATE | —802 |
| TAG | —804 |
| CODER | —806 |
| NEW/OLD | —808 |
| DELETED/NON-DELETED | —810 |
| # BYTES IN LAST SECTOR | —812 |
| LINK LIST | —814 |
| ETC. | —816 |

FIG. 8
SPEECH DATA SECTOR

PRIOR ART
900

| | | |
|---|---|---|
| 902— ENCODED SPEECH DATA | 0 | (0) |
| 904— ENCODED SPEECH DATA | 1 | |
| 906— ENCODED SPEECH DATA | 2 | |
| ⋮ | ⋮ | |
| 908— ENCODED SPEECH DATA | 127 | (7F) |

FIG. 9
CALL HISTORY MEMORY

PRIOR ART
412

| | |
|---|---|
| 700— | CALLER (-N) # |
| 702— | CALLER (-N+1) # |
| | ⋮ |
| 704— | LAST CALLER # |

ELASTIC BUFFER FOR DATA STORAGE WITH SPEECH DATA

BACKGROUND OF THE INVENTION

1. Field of the Invention

This invention relates to a method for associating and storing non-speech data with speech data. More particularly, it relates to a method for associating non-speech message data with speech message data as stored within common non-volatile memory, and is particularly useful in digital answering machines or electronic voice mail systems.

2. Background of Related Art

Voice messaging in telephony has been greatly advanced in recent years by the inclusion of digital information associated with a voice message. For instance, the development of caller ID and its ability to transmit digital caller information to a called party has created a demand for the storage of this non-speech data together with the associated speech message. In general, caller ID information allows the phone number and/or name of the calling party to be displayed or otherwise announced at the called party's answering machine or electronic voice mail. Conventional caller ID devices maintain a single separate memory area containing a chronological history of the caller ID information for a predetermined number of recent calls.

Answering or voice messaging machine designs have further benefited from the decreasing costs of non-volatile memory to the point at which digital answering machines and electronic voice mail systems are affordable and common. In these type voice messaging systems, speech data is stored digitally, i.e., in non-volatile memory rather than on a magnetic tape as in older messaging machines.

More recently, conventional digital answering machines have included caller ID capability by combining conventional digital speech storage functions with a conventional caller ID block which displays and maintains a chronological history of recent calls. However, these conventional digital answering machines are basically a physical combination of known caller ID systems with known digital answering machines, with little or no integration of the memory needs of a digital answering machine (or electronic voice mail system) with those of a caller ID system.

FIG. 4 shows a conventional digital answering machine 400 combining the functionality of digital voice recording with caller ID memory and display. A telephone line 110 is input to an analog front end or telephone line interface 402 of the digital answering machine 400. The digital side of the telephone line interface 402 is connected to both a speech recording functional block 420 and a caller ID functional block 428.

The speech recording functional block 420 includes a processor 404 and non-volatile speech memory 406. The processor 404 may be a microprocessor, microcontroller, digital signal processor (DSP) or any other suitable processor or equivalent circuit. The non-volatile speech memory 406 may be any non-volatile digital storage device, e.g., RAM, EEPROM, flash memory, or even digital audio tape (DAT). The non-volatile speech memory 406 may additionally be internal or external to the processor 404.

FIG. 5 shows sectorization of the speech memory 406 into a plurality of sectors. As shown, 128 memory sectors 502–516, 550–564 are contained within the speech memory 406 of one type of conventional answering machine 400. Each sector contains 4 Kbytes of flash memory. Using today's coding techniques, each sector can store about five to ten seconds of speech data, although various rate coders exist.

FIG. 6 shows that there are 128 memory pages 602–610 within each memory sector 502–516, 550–564, and that there are 32 bytes of data in each of the 128 memory pages 602–610. Accordingly, up to 32 bytes of speech data can be stored in each page of speech memory 406 in a typical digital answering machine 400.

The speech memory 406 of the conventional digital answering machine 400 contains only speech data (other than the header information for the stored speech data). Non-speech data is contained in a separate call history memory 412 (FIG. 4) associated with the caller ID functional block 428.

FIG. 7 shows a message table 800 contained in one sector of conventional speech memory 406. The message table 800 contains various header information relating to an underlying speech message stored in the same or linked page of speech memory 406. Conventional header type information includes a time/date stamp 802 indicating the time and date when an underlying speech message was stored. TAG information 804 in the header contains user defined data. Typically, to maximize efficiency in the digital answering machine 400, the speech data is encoded. Thus, the header includes coder information 806 which relates to the type of encoding used to encode the underlying speech message data, e.g., the particular coder data rate. The new/old information 808 entry in the header of the message table 800 relates to whether or not the underlying speech message has been reviewed at least once by the user of the digital answering machine 400. The deleted/non-deleted information 810 in the header conventionally indicates whether or not the underlying speech message has been deleted by the user. The number of bytes in the last sector information 812 relates to the length of the speech message in the last sector in which the speech message is stored, avoiding replay of the unused portion of the last sector when replaying stored messages. The link list information 814 in the header indicates the addresses of all sectors used to store the speech message. Of course, additional header information 816 may be included in the message table 800 as desired.

Prior art systems store speech data in memory separate from the memory for storing non-speech data thereby requiring three management tables to associate the non-speech data with its underlying speech data, i.e., 1) speech data table, 2) non-speech data table, and 3) links between tables (1) and (2). Conversely, the present invention as will be described in more detail below provides integration of non-speech data with associated speech data into a common memory structure to require only one message table for each speech plus non-speech message.

FIG. 8 shows a sector in the speech memory 406 containing the underlying speech message 902–908. The sector shown in FIG. 8 is the first listed in the link list 814 of the message table 800 for the underlying speech message. Zero, one or more pages of speech data 902–908 may be listed in the link list 814 of a message table 800 for a single speech message.

Referring back to the digital answering machine shown in FIG. 4, the caller ID functional block 428 contains a caller ID decoder 414 which demodulates and interprets the caller ID information input over telephone line 110 associated with a call. Once decoded, the caller ID decoder 414 stores the caller ID data in the call history memory 412. The caller ID information decoded by the caller ID decoder 414 may be displayed on a graphical user interface (GUI) display 408 to indicate, e.g., the phone number, name or other information relating to the calling party. Conventionally, the GUI display 408 displays the caller ID information regarding any one of the most recent calls to the digital answering machine 400. Typically the number of calls for which the call history 412 retains caller ID information is limited only by the length of the call history memory. Moreover, non-speech information may easily be retained in the call history memory even after the associated voice message has been deleted. However, this separation of the non-speech data, e.g., the caller ID information, from the speech data may cause confusion to the user.

FIG. 9 shows a conventional call history memory 412. Typically, call history memory 412 has a fixed length, and thus is capable of storing only a fixed amount of caller ID information from only a fixed number of recent callers. Call history information must then occasionally be deleted from the call history memory 412 to allow for new caller ID information.

SUMMARY OF THE INVENTION

In a voice messaging system, speech data is stored along with the non-speech data associated with that speech data in a common sector of memory. The voice message memory is divided into a plurality of sectors. When a voice message is received, non-speech data related to the voice message is stored in one of the sectors along with the speech data related to the voice message.

BRIEF DESCRIPTION OF THE DRAWINGS

Features and advantages of the present invention will become apparent to those skilled in the art from the following description with reference to the drawings, in which:

FIG. 2 shows a sector of memory containing a message table in the exemplary embodiment of a digital answering machine shown in FIG. 1.

FIG. 3 shows a sector of memory containing both non-speech and speech data in the exemplary embodiment of a digital answering machine shown in FIG. 1.

FIG. 7 shows a sector of memory containing a message table in the conventional digital answering machine shown in FIG. 4.

FIG. 8 shows a sector of memory containing only speech data in the conventional digital answering machine shown in FIG. 4.

FIG. 9 shows the contents of call history memory in a conventional digital answering machine shown in FIG. 4.

DETAILED DESCRIPTION OF ILLUSTRATIVE EMBODIMENTS

Figure 1:
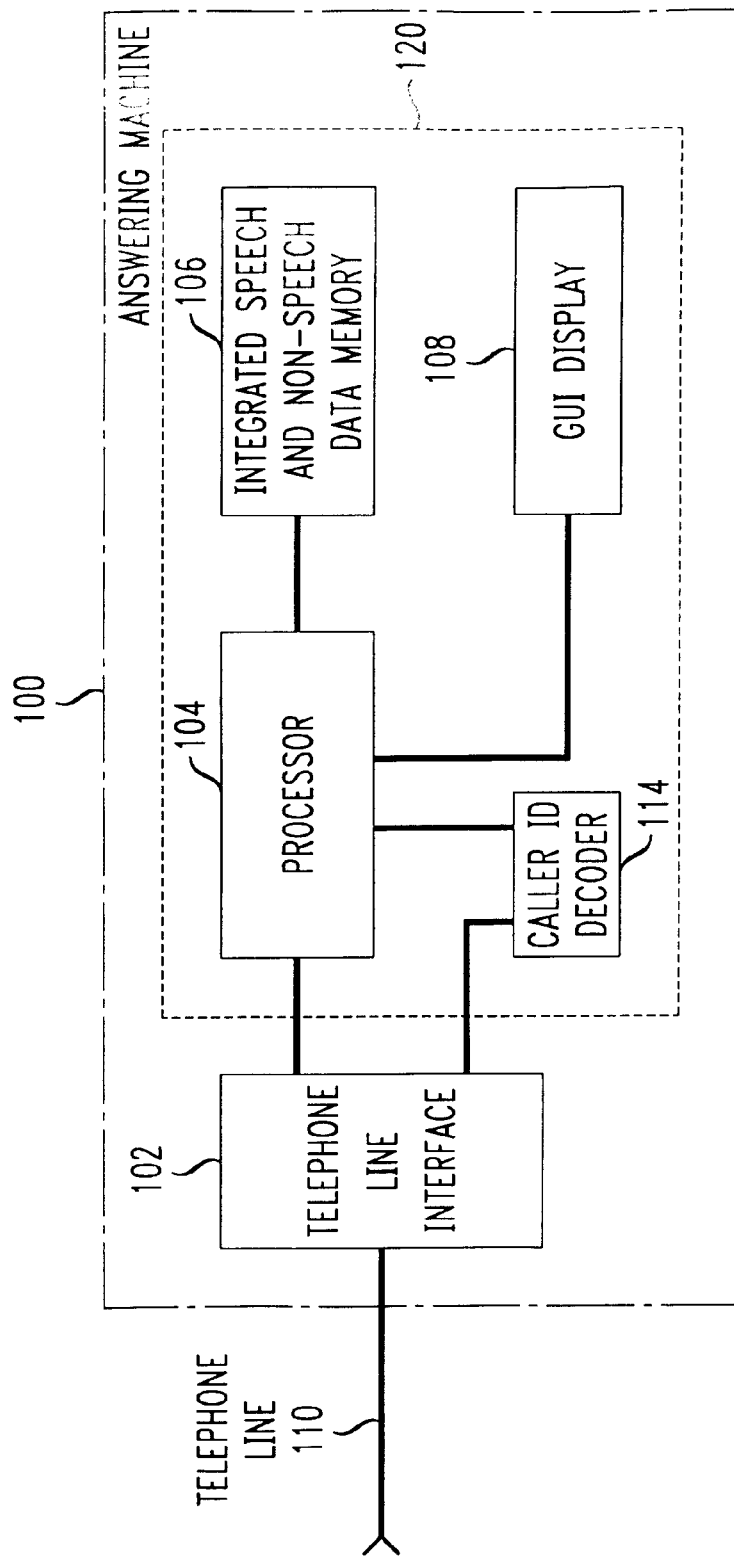
FIG. 1 shows an exemplary embodiment of a digital answering machine with integrated speech and non-speech memory according to the present invention.
Figure 4:
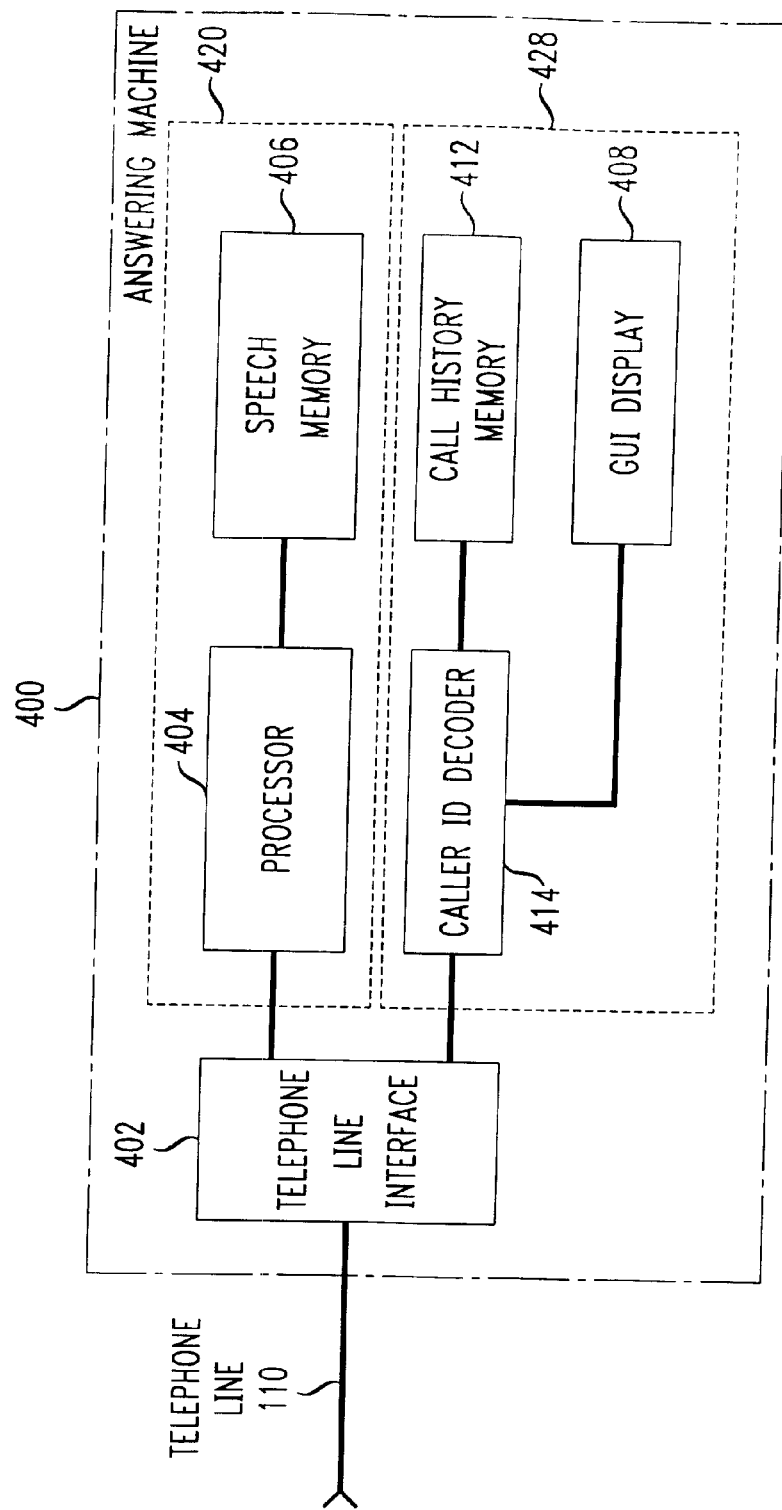
FIG. 4 shows a conventional digital answering machine having caller ID capability.
Figures 5, 6:
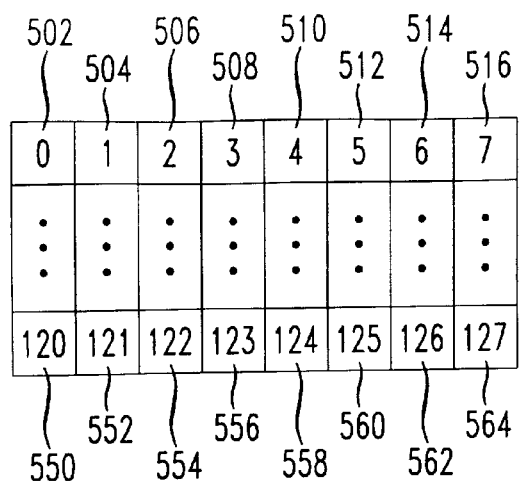
FIG. 5 shows sectorization of the message memory of the conventional digital answering machine shown in FIG. 4.
FIG. 6 shows the pages in each sector of the message memory shown in FIG. 5.

FIG. 1 is an exemplary embodiment showing a digital answering machine according to the present invention. Although the present invention is shown embodied in a digital answering machine, the present invention is equally applicable to voice messaging systems in general, electronic voice mail systems, or any other memory system which associates and stores both non-speech data and related speech data.

In the digital answering machine 100 shown in FIG. 1, a telephone line 110 is input to an analog front end or telephone line interface 102. The telephone line interface 102 is connected to an integrated speech/non-speech functional block 120 including a processor 104, a caller ID decoder 114, and an integrated data memory 106 for storing both speech data such as a voice, and non-speech data (such as caller ID information) associated therewith.

The storage of both speech and non-speech data in the integrated speech and non-speech data memory 106 in the exemplary embodiment is controlled by the processor 104. The caller ID decoder 114 does not store the non-speech data separate from the speech data as in the prior art. The prior art requires the establishment of three message table pages: one for the speech data; a second for the non-speech caller ID data; and a third to associate the speech data with the non-speech data. The present invention provides an integration of the speech and non-speech data such that only a single message table sector is required as shown in FIG. 2.

Referring back to FIG. 1, although the caller ID decoder 114 is shown as a separate component in FIG. 1, it may be possible to implement the caller ID decoder 114 either within software running on the processor 104 or as an additional integrated circuit (IC) integrated with or otherwise combined with the processor 104.

A GUI display 108 displays caller ID or other non-speech information either received over the telephone line 110, stored in the integrated speech and non-speech data memory 120, or as otherwise determined by the processor 104. For instance, the GUI display 108 may display textual, graphical or pictorial information constituting non-speech data as instructed by the caller ID decoder 114.

The integrated speech and non-speech data memory 106 is sectorized, and each sector is separated into a plurality of pages which each include an elastic buffer for non-speech data which is associated with speech data contained within that or a linked page. Thus, non-speech data of variable lengths can be associated with the underlying speech data in a common sector of the integrated speech and non-speech data memory 106, avoiding the inefficiency, waste and expense of maintaining three message tables as in the prior art to associate a caller ID, image or other non-speech data memory with its speech data stored in separate speech memory. Preferably, the common integrated data memory 106 is controlled by a single processor.

The sectorization of the speech memory 406 is dictated somewhat by the specific requirements of flash memory, i.e., that an entire block of memory must be written to or erased from speech memory 406 at a time. For instance, the FLASH memory utilized in one embodiment of the present invention includes page write and sector erase capability. For instance, a page of 32 bytes must be written to at any one time, while a sector of 4096 bytes must be erased at any one time. However, the sectorization is equally applicable to other types of RAM which do not necessarily require that more than one byte of memory be written to or erased from at any one time.

The ability to accommodate non-speech data of variable lengths is important to provide sufficient flexibility between various types of non-speech data which may be associated with speech data without wasting memory due to a fixed length non-speech data buffer. However, if desired, fixed length non-speech offset values in the message table are possible according to the present invention. For instance, a variable length buffer for non-speech data provides flexibility sufficient to accommodate caller ID standards throughout the world, including but not limited to the U.S. Public Switched Telephone Network (U.S. PSTN), and standards developed and/or utilized by Nippon Telegraph and Telephone Corporation, British Telecom and France Telecom.

An offset value 202 is provided in the message table 200 to provide variability in the length of the storage area for the non-speech data associated with related speech data. The value of the offset 202 refers to the relative location or address in the data sector 300 of the first byte or start of the speech data 902–908 after the addresses of associated non-speech data in the same or linked sector. According to the exemplary embodiment, the non-speech data 352–358 is stored in the offset or skipped over area of the page. Thus, the value of the offset 202 in the message table 200 is not a fixed value, and thus does not refer to a fixed length non-speech data buffer. Rather, as shown in the message table 200 shown in FIG. 2, the value of the offset 202 is varied based on the actual length of the received non-speech data 352–358. Thus, the speech data 902–908 is moved upward to higher addresses in the sector to make room for associated non-speech data 352–358.

For instance, as shown in FIG. 3, if the value of the offset 202 is N, where N is an integer between 0 and the length of the sector (which in the present embodiment is 127), then the non-speech data 352–358 is stored by processor 104 (FIG. 1) between local or relative address 0 and (N-1) of the data sector 300. Moreover, the underlying speech data 902–908 associated with that particular non-speech data 352–358 is stored in the subsequent portion of the data sector 300 starting at local address N and continuing upward in addressing in the data sector 300. If more than one data sector 300 is required to store the speech data 902–908, i.e., if the speech message is larger than about six seconds, then additional sectors of memory are linked to that message by the corresponding message table.

A local address refers to the relative location within any particular page of sectorized memory. For instance, in memory which is sectorized into 128 4Kb sectors, each sector having 128 32byte pages, the local addresses for each of the pages of memory is 0 to 127 decimal (00h to 7fh).

The resulting speech plus non-speech messages become very easy to erase because the non-speech is associated in integrated, common memory with the speech in a message table. Only a single memory pointer is needed to access both speech data and non-speech data.

Moreover, the system is flexible enough to accommodate even speech only storage by setting the offset value 202 shown in FIG. 2 to zero. The invention further allows a telephone answering device or voice mail system to display the non-speech data, e.g., the caller ID information, while the associated speech data is being played by the voice messaging system.

While the invention has been described with reference to the exemplary preferred embodiments thereof, those skilled in the art will be able to make various modifications to the described embodiments of the invention without departing from the true spirit and scope of the invention.

We claim:

1. A method of storing non-speech data with associated speech data, comprising:

storing non-speech data related to a received message in a memory;

storing associated speech data related to said received message in said memory; and determining address information relating to one of said non-speech data and said speech data based on a length the other of said non-speech data and said speech data.

2. The method according to claim 1, wherein:

said speech data is stored in a sector adjacent to at least one sector corresponding to said non-speech data.

3. The method according to claim 1, wherein:

said step of storing said non-speech data occurs before said step of storing said speech data.

4. The method according to claim 1, wherein:

said step of storing said speech data occurs before said step of storing said non-speech data.

5. The method according to claim 2, wherein:

said speech data is stored at a higher address than said on-speech data.

6. The method according to claim 1, further comprising:

providing a message table identifying a location of said speech data in said memory, said message table including an offset value.

7. The method according to claim 1, further comprising:

storing an offset value in said memory corresponding to a length of said non-speech data.

8. The method according to claim 1, wherein:

said memory is flash memory.

9. The method according to claim 1, wherein:

said non-speech data is caller ID information.

10. The method according to claim 1, wherein:

said non speech data includes call related information.

11. A method of storing non-speech data with associated speech data comprising:

dividing memory into a plurality of sectors;

storing non-speech data related to a message in one of said sectors wherein said non-speech data is an image;

storing associated speech data related to said message in said one of said sectors; and identifying said one of said sectors using an offset value based on a length of said non-speech data.

12. A method of storing speech data and non-speech data both associated with a common message, comprising:

receiving said non-speech data and said speech data into a voice messaging system;

storing one of said non-speech data and said speech data in a memory of said voice messaging system; and offsetting one of said non-speech data and said speech data from the other of said non-speech data and said speech data based on a length of at least one of said non-speech data and said speech data.

13. The method according to claim 12, wherein said first storing step stores said non-speech data, said method further comprising:

storing an offset value in said memory corresponding to a length of said non-speech data.

14. The method according to claim 12, further comprising:

integrating the other of said non-speech data and speech data in said memory to associate said speech data with said non-speech data as one message.

15. A method of organizing non-speech data with related speech data, comprising:

receiving non-speech data and speech data associated with a message into a voice messaging system;

storing said non-speech data in a memory of said voice messaging system;

storing said speech data in said memory, said speech data related to said non-speech data; and revising only one table to associate non-speech data with said speech data such that said non-speech data and said speech data are related to a same message wherein said one table includes an offset value based on a length of said non-speech data.

16. The method according to claim 15, wherein:

said speech data is stored immediately adjacent said non-speech data in said memory.

17. The method according to claim 15, wherein:

said step of storing said non-speech data occurs before said step of storing said speech data.

18. The method according to claim 15, wherein:

said step of storing said speech data occurs before said step of storing said non-speech data.

19. The method according to claim 16, wherein:

said speech data is stored at a higher address than said non-speech data.

20. The method according to claim 15, wherein:

said memory is flash memory.

21. The method according to claim 15, wherein:

said non-speech data is caller ID information.

22. A method of organizing non-speech data with related speech data, comprising:

storing non-speech data in memory;

storing speech data related to said non-speech data in said memory wherein said non-speech data is an image; and revising one table to associate said non-speech data with said speech data such that said non-speech data and said speech data are related to a same message wherein said one table includes an offset value based on a length of one of said non-speech data and speech data.

23. A voice messaging apparatus comprising:

a telephone line interface;

a processor connected to said telephone line interface;

a caller ID decoder connected to said telephone line interface;

a non-volatile memory connected to said processor, said non-volatile memory including a page containing both non-speech data decoded by said caller ID decoder and speech data associated with said non-speech data.

24. The voice messaging apparatus according to claim 23, wherein:

said non-volatile memory is flash memory.

25. A voice messaging portion of a memory in a voice messaging system consisting of:

non-speech data;

speech data related to said non-speech data wherein said non-speech data and said speech data are related to a same voice message; and one table to associate said non-speech data with said speech data wherein said table includes an offset value based on a length of one of said non-speech data and said speech data.

26. A method of storing a message, comprising:

creating a single table in a memory of a voice messaging system;

receiving speech data and non-speech data related to said message in said voice messaging system; and entering at least one entry into said single table, said at least one entry including an address of said speech data related to said message and an offset value from said address of said speech data, said offset value indicating a relative stored location of said non-speech data related to said message.

27. The method of storing a message in accordance with claim 21, wherein:

said speech data is stored in a sector of said memory adjacent to said non-speech data.

28. The method of storing a message in accordance with claim 26, further comprising:

storing said associated non-speech data related to said message in one of a plurality of sectors of said memory; and storing said speech data related to said message in said one of a plurality of sectors.

29. The method of storing a message in accordance with claim 28, wherein:

said step of storing said associated non-speech data is performed before said step of storing said speech data.

30. The method of storing a message in accordance with claim 28, wherein:

said step of storing said speech data is performed before said step of storing said associated non-speech data.

31. The method of storing a message in accordance with claim 28, wherein:

said speech data is stored at a higher absolute address than that of said associated non-speech data.

32. The method of storing a message in accordance with claim 26, wherein:

said offset corresponds to a length of said associated non-speech data.

33. The method of storing a message in accordance with claim 26, wherein:

said memory is flash memory.

34. The method of storing a message in accordance with claim 26, wherein:

said associated non-speech data is related to sender of said message.

35. The method of storing a message in accordance with claim 26, wherein:

said associated non-speech data is an image.

\* \* \* \* \*